(12) United States Patent
Mielke et al.

(10) Patent No.: US 7,552,386 B2
(45) Date of Patent: Jun. 23, 2009

(54) METHODS AND SYSTEMS FOR TREATING OVERFLOW CONDITIONS AND FOR RE-SIZING PRINTABLE CONTENT

(75) Inventors: Markus W. Mielke, Redmond, WA (US); Adrian Bateman, Staffordshire (GB)

(73) Assignee: Microsoft Corporation, Redmond, WA (US)

( * ) Notice: Subject to any disclaimer, the term of this patent is extended or adjusted under 35 U.S.C. 154(b) by 572 days.

(21) Appl. No.: 11/150,831

(22) Filed: Jun. 10, 2005

(65) Prior Publication Data

US 2006/0282768 A1    Dec. 14, 2006

(51) Int. Cl.
*G06F 17/00* (2006.01)
(52) U.S. Cl. ............... 715/273; 715/243; 715/255; 715/252; 715/277
(58) Field of Classification Search ......... 715/255–256, 715/273–274, 243, 277, 252, 517, 272, 530–531, 715/527
See application file for complete search history.

(56) References Cited

U.S. PATENT DOCUMENTS

| | | | |
|---|---|---|---|
| 5,425,138 A | | 6/1995 | Kumakawa |
| 5,577,187 A | * | 11/1996 | Mariani ................. 715/792 |
| 5,796,401 A | | 8/1998 | Winer |
| 5,835,920 A | * | 11/1998 | Horton ................. 715/210 |
| 5,956,737 A | * | 9/1999 | King et al. ............. 715/202 |
| 6,144,975 A | | 11/2000 | Harris, Jr. et al. |
| 6,718,518 B1 | | 4/2004 | Plow et al. |
| 7,212,309 B1 | * | 5/2007 | Sellers et al. ........... 358/1.2 |
| 7,249,319 B1 | * | 7/2007 | Payne et al. ............ 715/209 |
| 2002/0172418 A1 | * | 11/2002 | Hu ........................ 382/166 |
| 2003/0172355 A1 | | 9/2003 | Ponce et al. |
| 2003/0229856 A1 | | 12/2003 | Lynn et al. |
| 2005/0055636 A1 | * | 3/2005 | Graves ................. 715/526 |
| 2005/0262441 A1 | * | 11/2005 | Yoon .................... 715/526 |
| 2006/0026512 A1 | * | 2/2006 | Hays et al. ............. 715/525 |

OTHER PUBLICATIONS

"Boxer's Feature List", Aquarian Technologies, found at http://www.aquatee.com/Products/Boxer_Text_Editor/features.htm, retrieved on Apr. 15, 2005, 9 pgs.

"Inserting Pre-Formatted Pages in a Document", Pages Help, found at http://docs.info.apple.com/article.html?artnum=165820, retrieved on Apr. 15, 2005, 1 pg.

* cited by examiner

*Primary Examiner*—Thu Huynh

(57) ABSTRACT

Various embodiments evaluate content that is to be printed and ascertain whether the content is going to overflow or be "orphaned" onto a second page when printed. If some content will create an orphan when printed, then the content is scaled to fit onto a single page when printed. In some embodiments, the content is simply proportionally scaled to fit onto a single page. In other embodiments, the content is further processed to scale it in a manner that makes intelligent use of the white space on the printed page.

11 Claims, 8 Drawing Sheets

Layout Rectangle = $((h_1 + h_2), w/\alpha')$
Scaling Factor = $\alpha = h_1/(h_1 + h_2)$

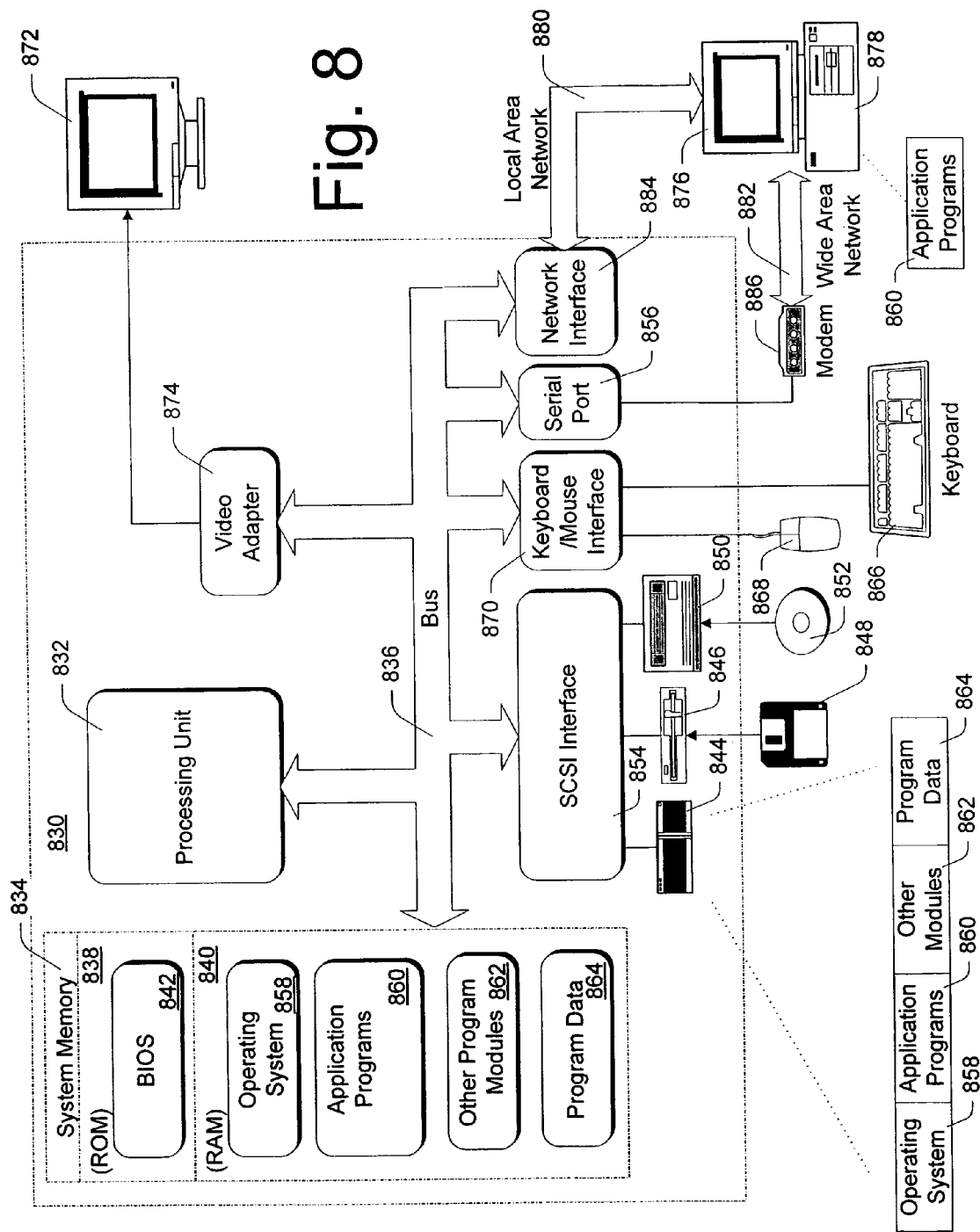

METHODS AND SYSTEMS FOR TREATING OVERFLOW CONDITIONS AND FOR RE-SIZING PRINTABLE CONTENT

TECHNICAL FIELD

This invention pertains to methods and systems for printing content.

BACKGROUND

Printing is a very important feature that is provided by many software applications for end users. For example, email applications typically allow a user to print email message to create a hard copy record. Likewise, other applications such as word processing applications, browser applications and the like permit a user to print various pages. Yet, these types of applications, as well as others, often have inefficiencies that not only make the end user's experience not all that it could be, but waste paper as well.

As an example, consider the following in connection with FIG. 1. There, a system 100 includes a monitor 102 on which a page of content 104 appears and is displayed for a user. Assume that the user wishes to print the content on a printer, such as the one shown at 106. When the user prints the content, many times the content will be printed across two pages, such as those pages shown at 108. Notice here that a first page 110 includes a majority of the content that was displayed for the user, and a second page 112 includes a very small amount of content 114. Using a second page to print only a very small amount of content wastes paper and can tend to annoy end users.

Accordingly, this invention arose out of concerns associated with providing improved methods and systems for printing content.

SUMMARY

Various embodiments evaluate content that is to be printed and ascertain whether the content is going to overflow or be "orphaned" onto a second page when printed. If some content will create an orphan when printed, then the content is scaled to fit onto a single page when printed.

In some embodiments, the content is simply proportionally scaled to fit onto a single page. In other embodiments, the content is further processed to scale it in a manner that makes intelligent use of the white space on the printed page.

BRIEF DESCRIPTION OF THE DRAWINGS

FIG. 8 illustrates an exemplary computing device that can be used to implement one or more embodiments.

DETAILED DESCRIPTION

Overview

The embodiments described below evaluate content that is to be printed and ascertain whether the content is going to overflow or be "orphaned" onto a second page when printed. If some content will create an orphan when printed, then the content is scaled to fit onto a single page when printed.

In some embodiments described below, the content is simply proportionally scaled to fit onto a single page. In other embodiments, the content is further processed to scale it in a manner that makes intelligent use of the white space on the printed page.

Proportional Scaling

In one embodiment, content that is to be printed is evaluated to ascertain whether printing the content will create an orphan on a second printed page. If an orphan will be created on a second printed page, then the content is proportionally scaled to fit onto a single page when printed.

As an example, consider FIG. 2 and the discussion below. There, content is indicated generally at 200. Here, content 200 is evaluated to ascertain whether, when printed, it will create an orphan. In this example, two pages 202, 204 are indicated and diagrammatically illustrate that an orphan (i.e. that portion of content appearing on page 204) will be created. Any suitable methodology can be employed to ascertain whether content will create an orphan when printed. In at least one embodiment, the height of the content that would appear on the second page—that is, the height of the content appearing on page 204 in this example, is compared to the printable height of the page (i.e. the height that contains the content of the page) on which it would appear—that is, the printable height of page 204. If the height of the content is less than some predefined percentage of the printable height of the page, then the content is classified as an orphan. Any suitable predefined percentage can be employed, e.g. ten percent. Hence, if the height of the content appearing on the second page is less than ten percent of the printable height of the page, then this content is classified as an orphan.

Once classified as an orphan, a layout structure is defined to include the content that would appear on the first and second page. In this example, a layout structure 206 is defined in the form of a layout rectangle and contains the content that would appear on the first and second pages. In this example, the layout structure is exaggerated in its length for illustrative purposes only. Next, having defined the layout structure to include the content that would appear on the first and second page, the layout structure is scaled proportionally, in the direction of the arrow, so that the content fits onto a single page. Notice scaled layout structure 208 and the content contained within it fits on a single page.

Figure 3:
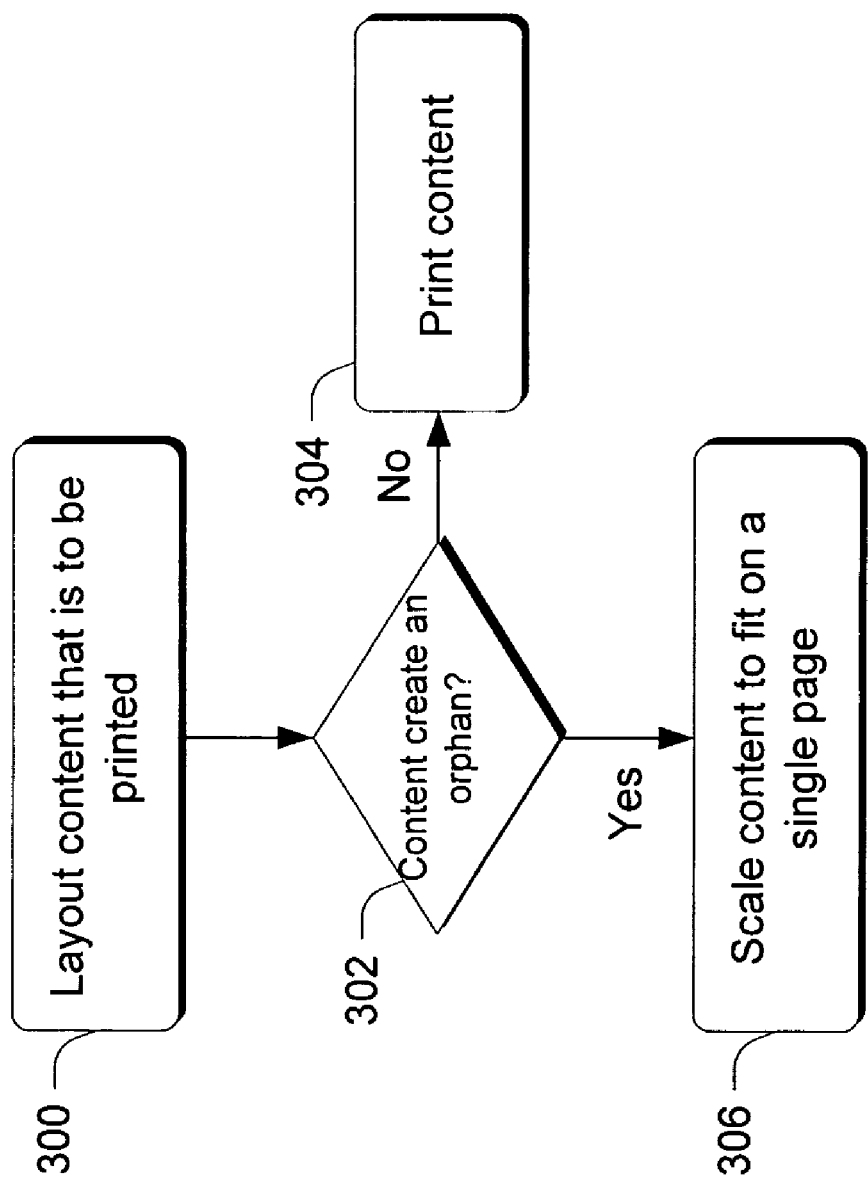
FIG. 3 is a flow diagram that describes steps in a method in accordance with one embodiment.

FIG. 3 is a flow diagram that describes steps in a method in accordance with one embodiment. The method can be implemented in connection with any suitable hardware, software, firmware or combination thereof. In at least one embodiment, the method is implemented in software in the form of executable instructions that reside on some type of computer-readable media.

Step 300 lays out content that is to be printed. Any suitable method can be utilized to lay the content out for printing. Step 302 ascertains whether the laid out content will create an orphan. Any suitable criteria can be used to define an orphan. But one example of how an orphan can be defined is given above.

In an event the laid out content will not create an orphan, step 304 can proceed to print the content. If, however, step 302 ascertains that the laid out content will create an orphan, step 306 scales the content to fit on a single page. One example of how this can be done is given above.

Figure 1:
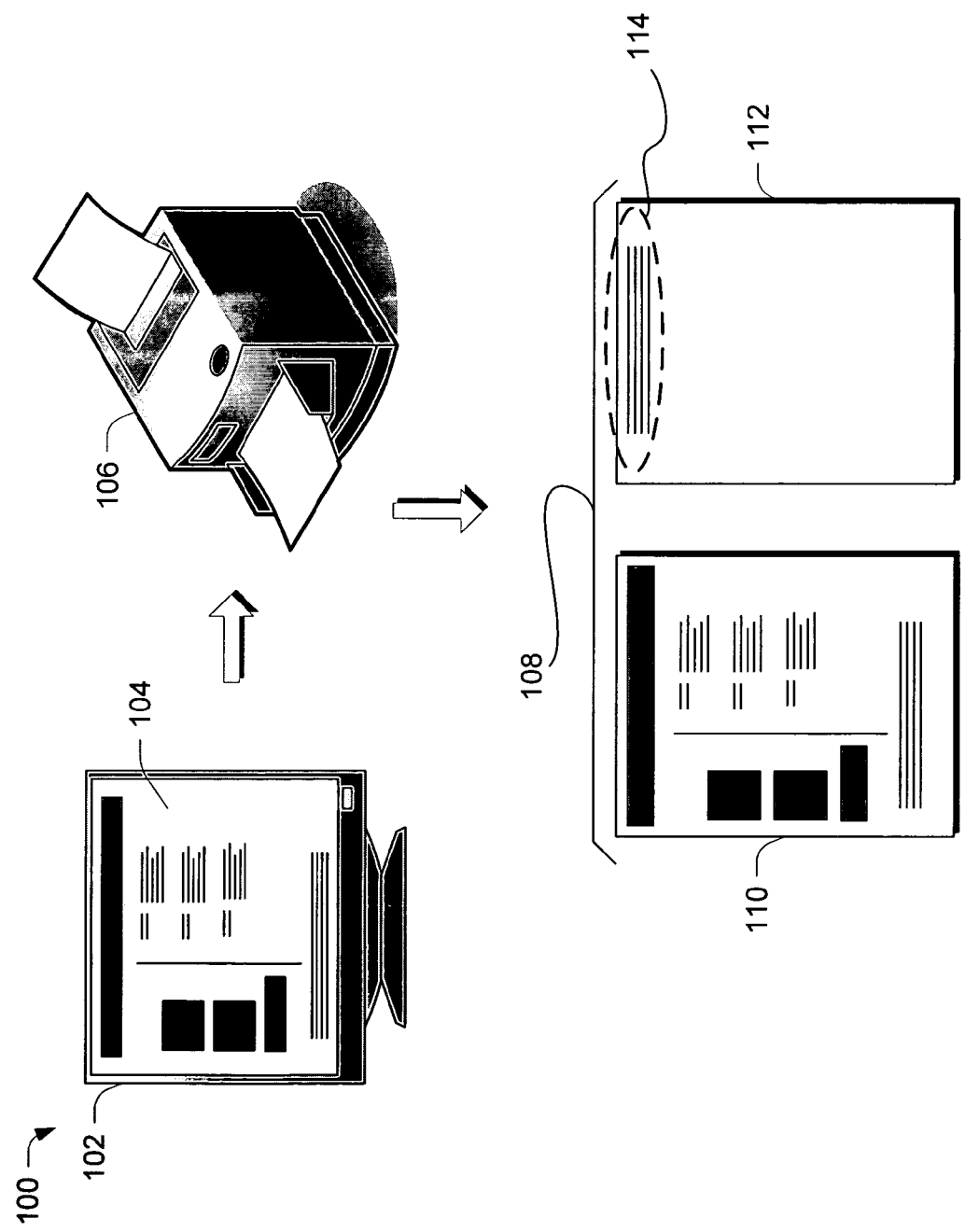
FIG. 1 illustrates an orphan situation in which content has been printed on a second page.
Figure 2:
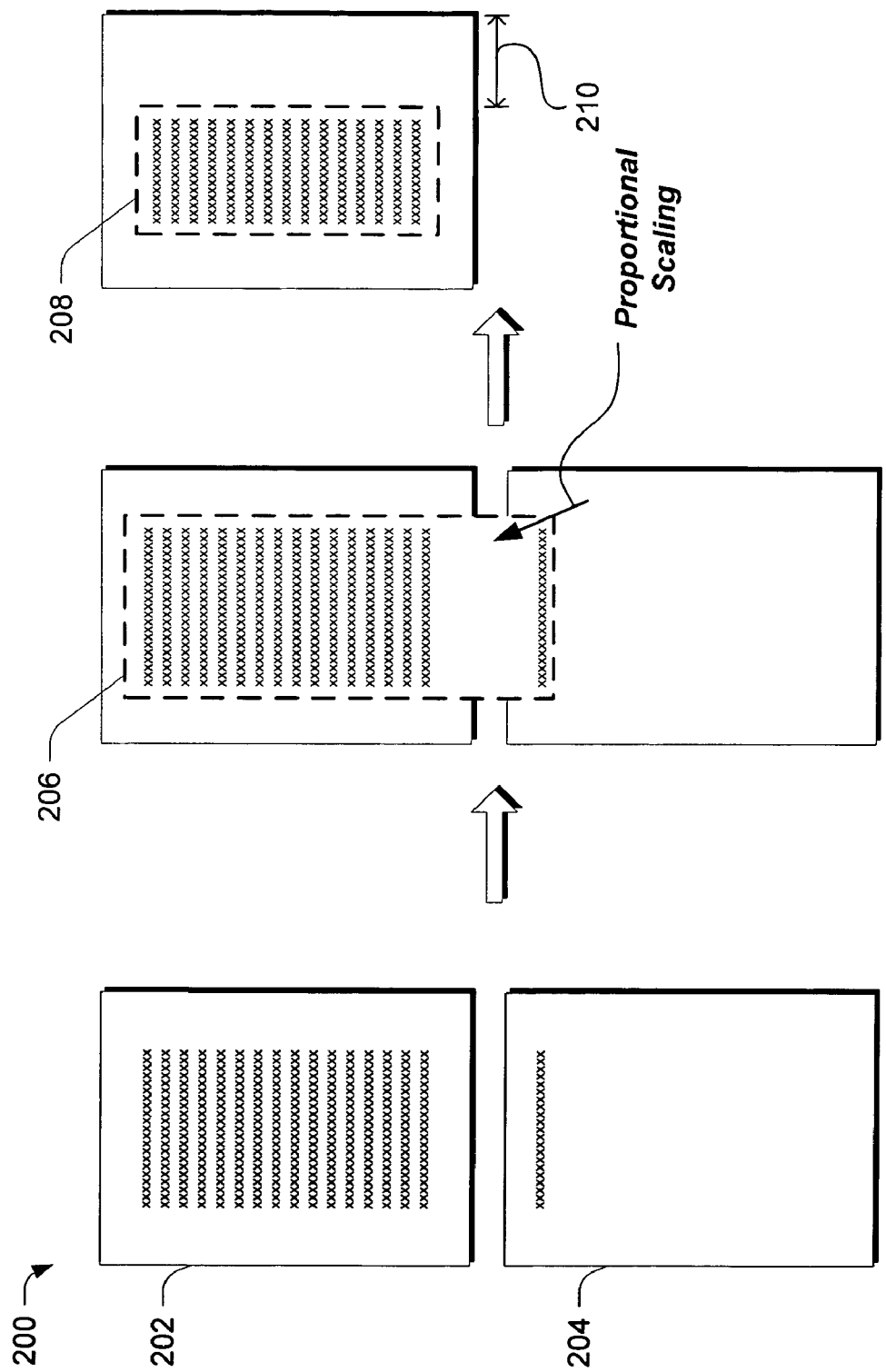
FIG. 2 diagrammatically illustrates a method in accordance with one embodiment.

Notice in FIG. 2 that while the content has been scaled to fit on a single page, a larger right margin area, indicated at 210, has been created. In some instances, this larger right margin area may not be a factor insofar as user satisfaction is concerned. Yet, in other instances, this larger right margin area may not necessarily be desirable. The reason for the larger right margin area stems from the fact that prior to defining the layout structure 206, the content was already laid out for printing. Since the content was laid out first and then scaled back, the larger right margin area appears.

To address this situation and to mitigate the effects of a larger right margin area stemming from proportional content scaling, at least some embodiments can employ intelligent re-sizing techniques described just below.

Intelligent Re-Sizing

In the intelligent re-sizing case, when an orphan is detected, the content is re-laid out. An intelligence decision is made with regard to the dimensions of the layout structure that is utilized to re-lay out the content such that when the content is scaled back, the content fits on to a single page and the previously-induced larger right margin area is eliminated or at least reduced. The intelligent decision is based, at least in part, on a computed scaling factor that attempts to use as much of the paper as possible to fit the content onto a single page.

Figure 4:
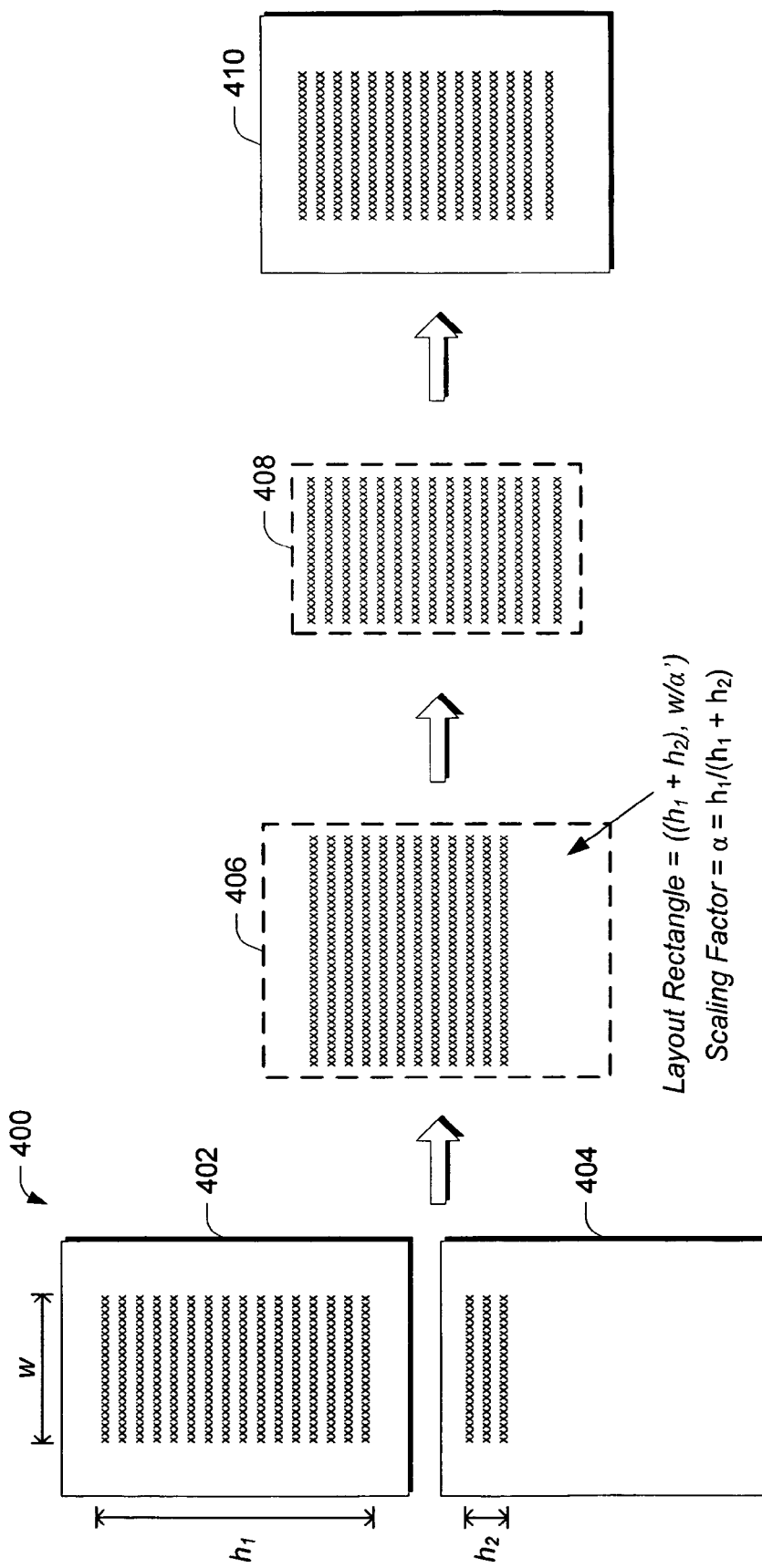
FIG. 4 diagrammatically illustrates a method in accordance with one embodiment.

As an example, consider FIG. 4. There, content is generally indicated at 400. Here, content 400 is evaluated to ascertain whether, when printed, it will create an orphan. In this example, two pages 402, 404 are indicated and diagrammatically illustrate that an orphan (i.e. that portion of content appearing on page 404) will be created. Any suitable methodology can be employed to ascertain whether content will create an orphan when printed. In at least one embodiment, the height of the content that would appear on the second page—that is, the height of the content appearing on page 404 in this example, is compared to the printable height of the page on which it would appear—that is, the printable height of page 404. If the height of the content is less than some predefined percentage of the printable height of the page, then the content is classified as an orphan. Any suitable predefined percentage can be employed, e.g. ten percent.

Once classified as an orphan, a scaling factor and a layout structure are defined so that the content can be reflowed or re-laid out into the layout structure and then scaled onto a single page. In this example, content 400 has a width w and a height which is represented as $h_1+h_2$. A scaling factor ($\alpha$) is computed as a ratio of the height of the content on the first page to the total height of the content. In this example, the scaling factor ($\alpha$) is represented as:

$h_1/(h_1+h_2)$.

As an example, consider that the width w and height $h_1$ of the content on the first page are, respectively, 20 units and 50 units. Assume also that the height of the orphan content $h_2$ is 10 units. Accordingly, the scaling factor ($\alpha$) would be 50/(50+10)=50/60 or 0.83.

Using the computed scaling factor ($\alpha$), and applying this scaling factor to the content (whose height is 60 units and whose width is 20 units), we arrive at a height dimension of 49.8 units and a width dimension of 16.6 units. Hence, at this point, the content just fits height-wise on one page. Width-wise, however, if this content were to be reflowed using a width of 20 units, the effective height of the content would be reduced, thus leaving a larger bottom margin than is desirable. For example, the new reflowed height of the content may now be 44 units.

Thus at this point, the following can be ascertained. At the original scaling factor of 1, the content's height dimension (60 units) was too high and created an orphan. At the scaling factor of 0.83, the content would not have created an orphan, but when reflowed using a width of 20 units, a larger than desirable bottom margin would be created. As the goal is to get the content to a height as close to 50 units as possible, the optimal scaling factor ($\alpha'$) would be somewhere between 0.83 and 1.0.

The optimal scaling factor can thus be computed in any suitable way. For example, trial and error calculations could be made. Alternately or additionally, a table can be used to ascertain the optimal scaling factor.

Consider again FIG. 4 and how a layout structure for reflowing the content can be computed and used. Initially, the length of the layout rectangle is defined as the total height of the content ($h_1+h_2$), and the width of the layout rectangle is defined as the width of the content w divided by the scaling factor ($\alpha$). Sometimes, the scaling factor that is initially computed will be sufficient to reflow the content to use the desirable amount of paper available. Yet in some instances, as noted above, the initially computed scaling factor will not be optimal. In this case, another scaling factor is computed and used.

In the FIG. 4 example, an exemplary layout structure 406 is provided having dimensions as set forth just above. Note that the dimensions of layout structure or rectangle are given by (($h_1+h_2$), $w/\alpha'$), where $\alpha'$ is the optimal scaling factor. Having now defined the layout structure 406, content 400 is re-flowed into the layout structure 406 and then the content is scaled back by the scaling factor $\alpha'$ so that the content fits on a single page. In the FIG. 4 example, the scaled back content is shown at 408. The printed content is shown on a printed page at 410. When scaled back as described above, the new width of the content would be 20 units and the height would be very close to 50 units.

Figure 5:
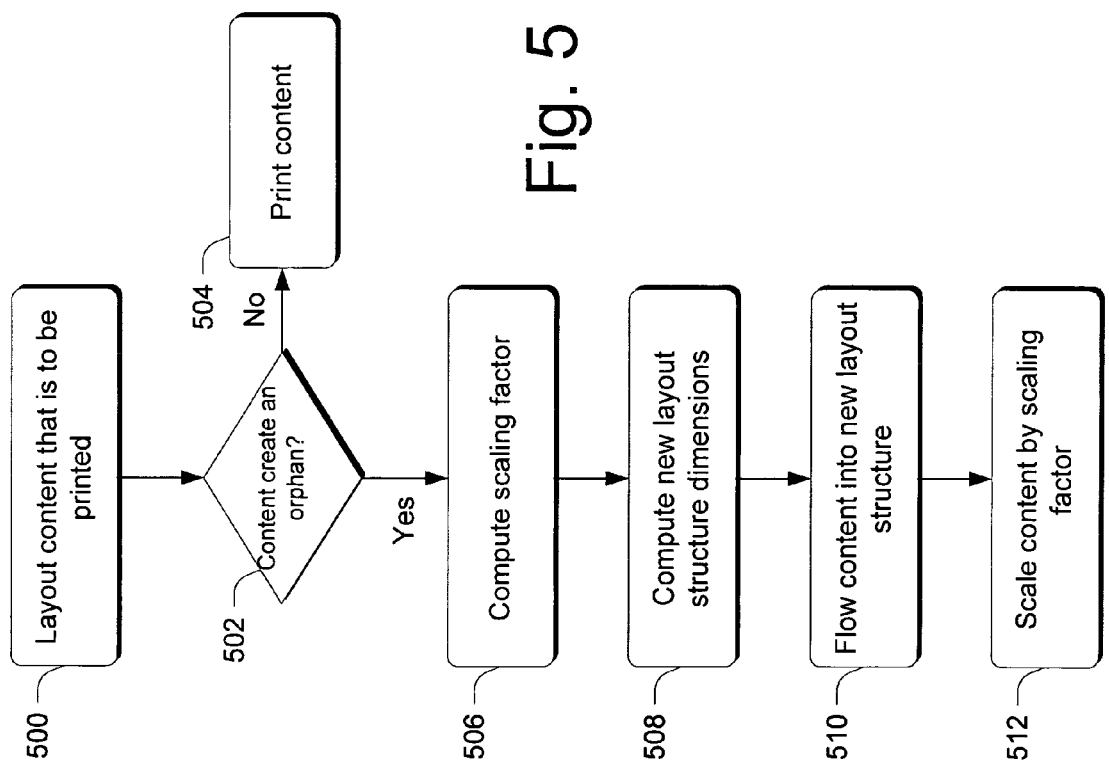
FIG. 5 is a flow diagram that describes steps in a method in accordance with one embodiment.

FIG. 5 is a flow diagram that describes steps in a method in accordance with one embodiment. The method can be implemented in connection with any suitable hardware, software, firmware or combination thereof. In at least one embodiment, the method is implemented in software in the form of executable instructions that reside on some type of computer-readable media.

Step 500 lays out content that is to be printed. Any suitable method can be utilized to lay the content out for printing. Step 502 ascertains whether the laid out content will create an orphan. Any suitable criteria can be used to define an orphan. But one example of how an orphan can be defined is given above.

In an event the laid out content will not create an orphan, step 504 can proceed to print the content. If, however, step 502 ascertains that the laid out content will create an orphan, step 506 computes a scaling factor that is to be used to scale the content. Any suitable scaling factor or technique for computing a scaling factor can be utilized. But one example of how to compute a scaling factor is provided above. Note that this step can result in multiple different scaling factors being computed to find the optimal scaling factor for a given printable height and width.

Step 508 computes new layout structure dimensions. Any suitable layout structure can be utilized. In the example above, a layout structure in the form of a rectangle was used. Other structures can be utilized without departing from the spirit and scope of the claimed subject matter. The dimensions of the new layout structure can be computed in any suitable way. In but one embodiment, at least some of the dimensions of the layout structure are a function of the computed scaling factor. In the example above, the width of the new layout structure is computed as a function of the scaling factor. Once the new layout structure dimensions have been computed, step 510 flows the content into the new layout structure and step 512 scales the content inwardly by the scaling factor.

By selecting an appropriate scaling factor and layout structure, the orphan-inducing content can be scaled in a manner such that it appears on a single page when printed.

Exemplary Systems

Figure 6:
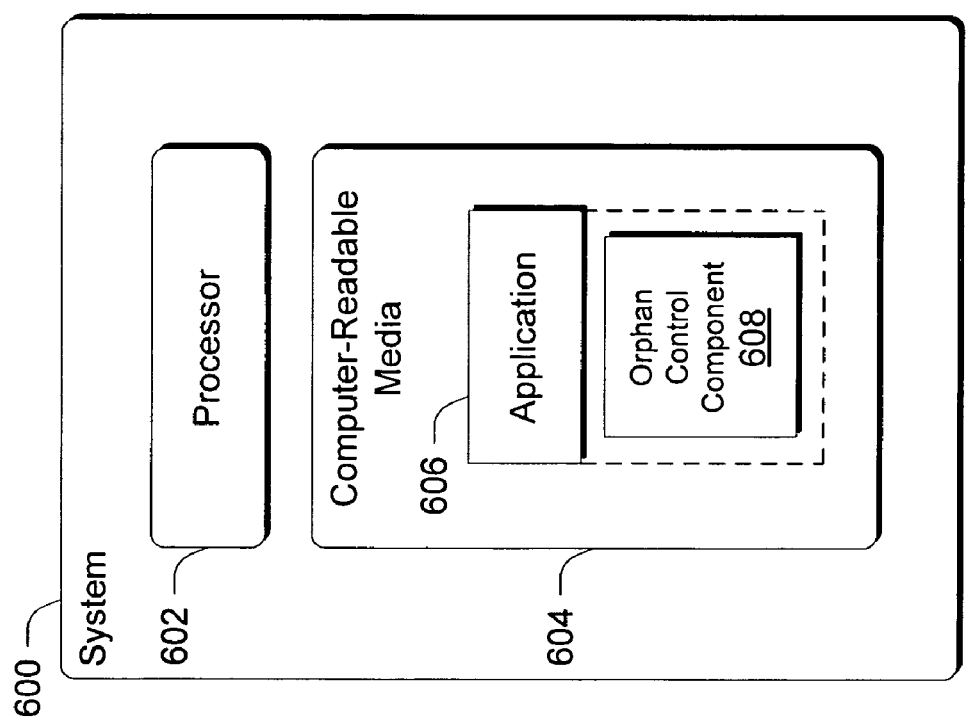
FIG. 6 illustrates an exemplary system in accordance with one embodiment.
Figure 7:
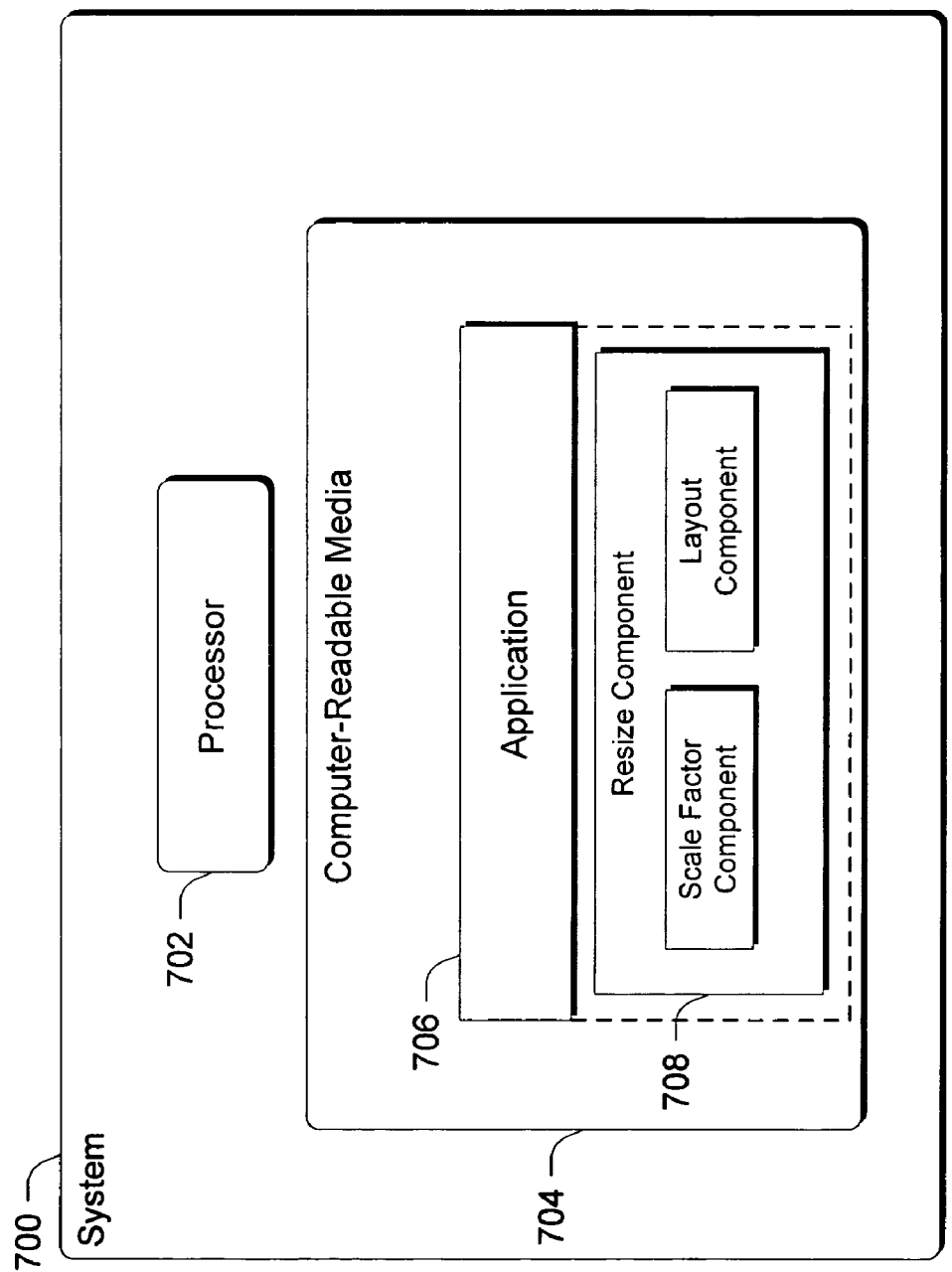
FIG. 7 illustrates an exemplary system in accordance with one embodiment.

FIGS. 6 and 7 illustrate exemplary systems in accordance with one embodiment.

FIG. 6 illustrates a system 600 that includes one or more processors 602 and computer-readable media 604 which includes embodied thereon, one or more applications 606 and an orphan control component 608. The orphan control component can comprise a standalone software component, or can comprise part of application(s) 606 (as indicated by the dashed line). Application(s) 606 can comprise any suitable application including, by way of example and not limitation, an email application, word processing application, Internet browser application and the like. In this particular embodiment, orphan control component 608 is configured to operate as was described above in connection with FIGS. 2 and 3.

FIG. 7 illustrates a system 700 that includes one or more processors 702 and computer-readable media 704 which includes embodied thereon, one or more applications 706 and a resize component 608. In this particular embodiment, resize component includes a scale factor component for computing scaling factors as described above, and a layout component for computing layout structures for resizing content as described above.

The resize component can comprise a standalone software component, or can comprise part of application(s) 706 (as indicated by the dashed line). Application(s) 706 can comprise any suitable application including, by way of example and not limitation, an email application, word processing application, Internet browser application and the like. In this particular embodiment, resize component 708 is configured to operate as was described above in connection with FIGS. 4 and 5.

Implementation Example

In an implementation, the above techniques can be employed as follows. Assume that a user is working within an application and desires to print a document. At this point, the user clicks on a print icon and the application begins to process the data for printing. In this example, current printing defaults are captured and initial layout rectangles with default settings are created. Once the initial layout rectangles are created, the content that is to be printed is flowed into the layout rectangles. At this stage, once the content has been flowed into the initial layout rectangles, the content is evaluated for orphans. Typically, this is done by checking the last page of the document that is to be printed. Techniques that can be utilized to identify orphans are identified above and, for the sake of brevity, are not repeated here.

If there is no orphan, then the document can simply be printed. If, on the other hand, an orphan is detected, a scaling factor is computed and a re-layout step is executed which re-defines the layout rectangle for the second-to-last page in the document. In some cases, the second-to-last page will be the first page of a document. Methods for computing scaling factors and for re-defining layout rectangles are described above and, for the sake of brevity, are not described here further. The content is then flowed into the new layout rectangle and subsequently scaled to fit into one page. Any suitable scale-to-fit algorithm can be utilized, as will be appreciated by the skilled artisan. Additionally, it is to be appreciated and understood that these techniques could be applied to the whole document. That is, in some embodiments, the whole document could be rescaled and reflowed so that all pages are at the same consistent scale, thus sharing, for example, consistent font sizes.

Exemplary Computing System

FIG. 8 shows an exemplary computer system having components that can be used to implement one or more of the embodiments described above.

Computer system 830 includes one or more processors or processing units 832, a system memory 834, and a bus 836 that couples various system components including the system memory 834 to processors 832. The bus 836 represents one or more of any of several types of bus structures, including a memory bus or memory controller, a peripheral bus, an accelerated graphics port, and a processor or local bus using any of a variety of bus architectures. The system memory 834 includes read only memory (ROM) 838 and random access memory (RAM) 840. A basic input/output system (BIOS) 842, containing the basic routines that help to transfer information between elements within computer 830, such as during start-up, is stored in ROM 838.

Computer 830 further includes a hard disk drive 844 for reading from and writing to a hard disk (not shown), a magnetic disk drive 846 for reading from and writing to a removable magnetic disk 848, and an optical disk drive 850 for reading from or writing to a removable optical disk 852 such as a CD ROM or other optical media. The hard disk drive 844, magnetic disk drive 846, and optical disk drive 850 are connected to the bus 836 by an SCSI interface 854 or some other appropriate interface. The drives and their associated computer-readable media provide nonvolatile storage of computer-readable instructions, data structures, program modules and other data for computer 830. Although the exemplary environment described herein employs a hard disk, a removable magnetic disk 148 and a removable optical disk 152, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 844, magnetic disk 848, optical disk 852, ROM 838, or RAM 840, including an operating system 858, one or more application programs 860, other program modules 862, and program data 864. A user may enter commands and information into computer 830 through input devices such as a keyboard 866 and a pointing device 868. Other input devices (not shown) may include a microphone, joystick, game pad, satellite dish, scanner, or the like. These and other input devices are connected to the processing unit 832 through an interface 870 that is coupled to the bus 836. A monitor 872 or other type of display device is also connected to the bus 836 via an interface, such as a video adapter 874. In addition to the monitor, personal computers typically include other peripheral output devices (not shown) such as speakers and printers.

Computer 830 commonly operates in a networked environment using logical connections to one or more remote computers, such as a remote computer 876. The remote computer 876 may be another personal computer, a server, a router, a network PC, a peer device or other common network node, and typically includes many or all of the elements described above relative to computer 830, although only a memory storage device 878 has been illustrated in FIG. 8. The logical connections depicted in FIG. 8 include a local area network (LAN) 880 and a wide area network (WAN) 882. Such networking environments are commonplace in offices, enterprise-wide computer networks, intranets, and the Internet.

When used in a LAN networking environment, computer 830 is connected to the local network 880 through a network interface or adapter 884. When used in a WAN networking environment, computer 830 typically includes a modem 886 or other means for establishing communications over the wide area network 882, such as the Internet. The modem 886, which may be internal or external, is connected to the bus 836 via a serial port interface 856. In a networked environment, program modules depicted relative to the personal computer 830, or portions thereof, may be stored in the remote memory storage device. It will be appreciated that the network connections shown are exemplary and other means of establishing a communications link between the computers may be used.

Generally, the data processors of computer 830 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

Conclusion

The embodiments described above evaluate content that is to be printed and ascertain whether the content is going to overflow or be "orphaned" onto a second page when printed. If some content will create an orphan when printed, then the content is scaled to fit onto a single page when printed.

In some embodiments, the content is simply proportionally scaled to fit onto a single page. In other embodiments, the content is further processed to scale it in a manner that makes intelligent use of the white space on the printed page.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A computer-implemented method comprising:
  ascertaining whether content that is to be printed by a printer will create an orphan, wherein the ascertaining comprises:
    determining a height of content that would be printed on a first page, a height of the content that would be printed on a second page, and a printable height of the second page;
    comparing the height of said content that would be printed on the second page with the printable height of the second page, wherein the printable height of the second page is less than a height of the second page;
    determining that the height of said content that would be printed on the second page is less than a predefined percentage of the printable height of the second page;
  based on determining that the height of said content that would be printed on the second page is less than the predefined percentage, classifying said content that would be printed on the second page as the orphan; and
  defining a layout structure to include said content, wherein the defining comprises:
    computing a scaling factor by dividing the height of the content that would be printed on the first page by the sum of the height of the content that would be printed on the first page and the height of the content that would be printed on the second page;
    computing at least a width dimension of the layout structure, wherein the width dimension is computed as a width of the content divided by the scaling factor; and
    scaling said layout structure inwardly in accordance with the scaling factor so that the content fits on the single page.

2. The method of claim 1, wherein the layout structure comprises a rectangle.

3. One or more computer-readable media having computer-readable instructions thereon which, when executed, implement the method of claim 1.

4. A computing device embodying the one or more computer-readable media of claim 3.

5. A computer-implemented method comprising:
  laying out content to be printed by a printer as laid out content;
  determining that the laid out content, when printed, will create an orphan, wherein the determining comprises:
    comparing a height of a portion of the laid out content that would be printed on a second page with a height of a portion of the second page that can contain printable content;
  based on the height of the portion of the laid out content that would be printed on the second page being less than a predefined percentage of the height of the portion of the second page that can contain printable content, classifying the height of the portion of the laid out content that would be printed on the second page as the orphan, wherein the height of the portion of the second page that can contain printable content is less than a height of the second page;
  computing a scaling factor by dividing a height of a portion of the laid out content that would be printed on a first page by the sum of the height of the portion of the laid out content that would be printed on the first page and the height of the portion of the laid out content that would be printed on the second page;
  computing a layout structure, wherein a width dimension of the layout structure is computed as a width of the laid out content divided by the scaling factor; and
  re-laying out the content to be printed as re-laid out content using the layout structure, the layout structure being scaled in accordance with the scaling factor to enable the re-laid out content to be printed on a single page.

6. The method of claim 5, wherein a height dimension of the layout structure is computed as a sum of the height of the portion of the laid out content that would be printed on the first page and the height of the portion of the laid out content that would be printed on the second page.

7. One or more computer-readable media having computer-readable instructions thereon which, when executed, implement the method of claim 5.

8. A computing device embodying the one or more computer-readable media of claim 7.

9. A computer-implemented method comprising:
ascertaining that content, when printed by a printer, will create an orphan, wherein the ascertaining comprises:
comparing a height of a portion of the content that would be printed on a second page with the second page's printable height;
based on the height of the portion of the content that would be printed on the second page being less than a predefined percentage of the second page's printable height, classifying the portion of the content that would be printed on the second page as the orphan;
computing a scaling factor as a function of a height of a portion of the content that would be printed on a first page and the height of the portion of the content that would be printed on the second page, wherein said computing comprises computing the scaling factor by dividing the height of the portion of the content that would be printed on the first page by a sum of the height of the portion of the content that would be printed on the first page and the height of the portion of the content that would be printed on the second page;
computing a layout structure having at least one dimension that is a function of the scaling factor, wherein said at least one dimension comprises a width of the layout structure, and wherein said width of the layout structure is computed as a width of the content divided by the scaling factor;
laying out the content using the layout structure; and
scaling the laid out content to be printable on a single page.

10. The method of claim 9, wherein a height dimension of the layout structure is computed as a sum of the height of the portion of the content that would be printed on the first page and the height of the portion of the content that would be printed on the second page.

11. The method of claim 9, wherein the printable height of the second page is less than a height of the second page.

* * * * *